United States Patent
Suzuki

(10) Patent No.: US 8,358,692 B2
(45) Date of Patent: Jan. 22, 2013

(54) IMAGE-PROCESSING APPARATUS AND METHOD THEREOF

(75) Inventor: Masaki Suzuki, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 12/109,717

(22) Filed: Apr. 25, 2008

(65) Prior Publication Data

US 2008/0279275 A1 Nov. 13, 2008

(30) Foreign Application Priority Data

May 11, 2007 (JP) ................................. 2007-127104

(51) Int. Cl.
*H04N 7/12* (2006.01)
*H04N 11/02* (2006.01)
*H04N 11/04* (2006.01)

(52) U.S. Cl. ......... 375/240.03; 375/240.12; 375/240.13; 375/240.22; 348/27; 382/236; 382/251; 382/253

(58) Field of Classification Search ............. 375/240.03, 375/240.1–240.29; 348/607, 400.1, 27; 382/233, 382/236, 251, 253
See application file for complete search history.

(56) References Cited

U.S. PATENT DOCUMENTS

| | | | | |
|---|---|---|---|---|
| 5,245,427 | A * | 9/1993 | Kunihiro | 348/400.1 |
| 5,751,358 | A * | 5/1998 | Suzuki et al. | 375/240.04 |
| 6,590,936 | B1 * | 7/2003 | Kadono | 375/240.12 |
| 7,308,146 | B2 * | 12/2007 | Becker et al. | 382/233 |
| 2003/0122967 | A1 * | 7/2003 | Kondo et al. | 348/607 |

OTHER PUBLICATIONS

XP000625575 Ding et al "Rate Control of MPEG Video Coding and Recording by Rate-Quantization Modeling", IEEE Transactions on Circuits and Systems for Video Technology, vol. 6, No. 1, Feb. 1, 1996, pp. 12-20.
XP030081045 Yang et al "A Rate Control Algorithm for MPEG-2 to H.264 Real-time Transcoding", Visual Communications and Image Processing; Beijing, Jul. 12, 2005, pp. 1995-2003.
XP000249317 Puri et al "Motion-Compensated Video Coding with Adaptive Perceptual Quantization" ,IEEE Transactions on Circuits and Systems for Video Technology, vol. 1, No. 4, Dec. 1, 1991, pp. 351-361.
XP000479218 Viscito et al "A Video Compression Algorithm with Adaptive Bit Allocation and Quantization", Visual Communication and Image Processing '91: Visual Communication, SPIE vol. 1605, Nov. 11, 1991, pp. 58-72.
XP010939874 Jing et al "A Novel Intra-Rate Estimation Method for H.264 Rate Control" 2006 IEEE International Symposium on Circuits and Systems, May 21, 2006, pp. 5019-5022.
The above articles were cited in a European Search Report issued on Apr. 11, 2012, that issued in the corresponding European Patent Application No. 08156022.9.

* cited by examiner

*Primary Examiner* — Sath V Perungavoor
*Assistant Examiner* — Nathnael Aynalem
(74) *Attorney, Agent, or Firm* — Cowan, Liebowitz & Latman, P.C.

(57) ABSTRACT

In order to set a quantization step according to a target amount of code with high precision, a coefficient set according to the resolution of a moving picture to be encoded and the encoding method of a frame to be encoded is selected from a plurality of coefficient sets corresponding to the resolutions of moving pictures and encoding methods of frames. A feature amount of the frame to be encoded is extracted, and when the frame to be encoded undergoes inter-frame coding, a function indicating the relationship between a quantization step and amount of generated data is generated based on the selected coefficient set and feature amount. When the function is generated, a quantization step according to a target amount of code is set based on that function in encoding of the frame to be encoded.

5 Claims, 7 Drawing Sheets

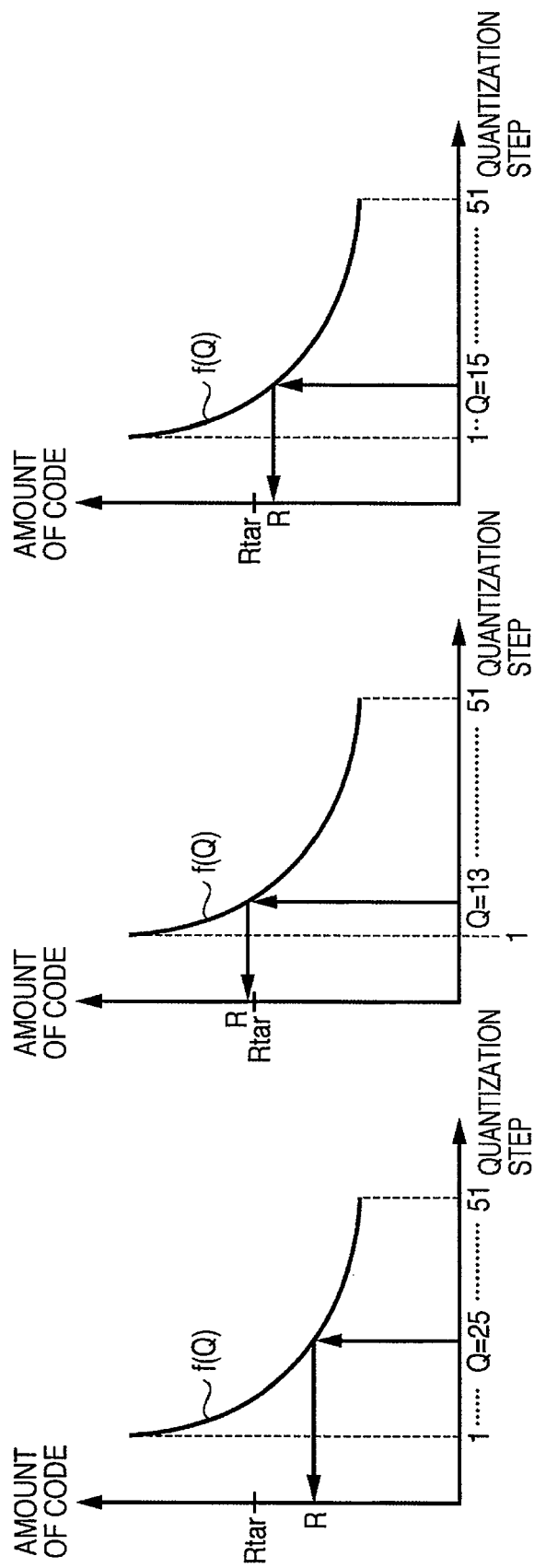

IMAGE-PROCESSING APPARATUS AND METHOD THEREOF

BACKGROUND OF THE INVENTION

1. Field of the Invention

The present invention relates to an image-processing apparatus for encoding a moving picture, and a method thereof.

2. Description of the Related Art

Since digital moving-picture data has a large amount of data, a technique is required for compressing the amount of data for recording and transmission. Recently, as input and output devices of moving-picture data use higher resolution and multi-tone levels, the amount of moving-picture data further increases, and data compression of moving-picture data becomes indispensable.

An apparatus that compresses and encodes moving-picture data executes rate control for controlling a quantization step when outputting moving-picture data onto a transfer path, the transfer rate of which is fixed. The rate control estimates an amount of generated data of a frame to be encoded, and controls a data compression rate (quantization step) based on the estimation result prior to actual encoding.

A method of using the amount of generated data of the previously encoded frame in estimation of the amount of generated data may be used. However, if a frame to be encoded is one after a scene change, in other words, if the encoded frame is that before a scene change, it will have different generation characteristics from data of those of the frame to be encoded. Therefore, when a scene change occurs, the amount of generated data cannot be correctly estimated. Of course, if the frame to be encoded is the first frame of moving-picture data, since there is no encoded frame, the amount of generated data cannot be estimated.

SUMMARY OF THE INVENTION

In one aspect, an image-processing apparatus for encoding a moving picture frame-by-frame, comprising: a coefficient memory which stores a plurality of coefficient sets corresponding to resolutions of frames and encoding methods of frames; a selector, arranged to acquire information indicating a resolution of a frame to be encoded, and to select, from the coefficient memory, a coefficient set according to the resolution and an encoding method of the frame to be encoded; an extractor, arranged to extract a feature amount of the frame to be encoded; a generator, arranged to generate, in a case that the frame to be encoded undergoes inter-frame predictive coding, a function representing a relationship between a quantization step and an amount of generated data based on the selected coefficient set and the feature amount; and a setting section, arranged to set, in a case that the generator generates the function, a quantization step according to a target amount of code based on the function in encoding of the frame to be encoded.

According to the aspect, the quantization step can be set with high precision according to a target code amount. Also, the quantization step can be set according to the target code amount in consideration of a scene change.

Further features of the present invention will become apparent from the following description of exemplary embodiments with reference to the attached drawings.

BRIEF DESCRIPTION OF THE DRAWINGS

FIGS. 7A to 7C are views for explaining a method of determining a quantization step corresponding to a target code amount using a QR function.

DESCRIPTION OF THE EMBODIMENTS

An image-processing apparatus and method thereof according to the embodiments of the present invention will be described in detail hereinafter with reference to the accompanying drawings.

First Embodiment

Arrangement of Apparatus

Figure 1:
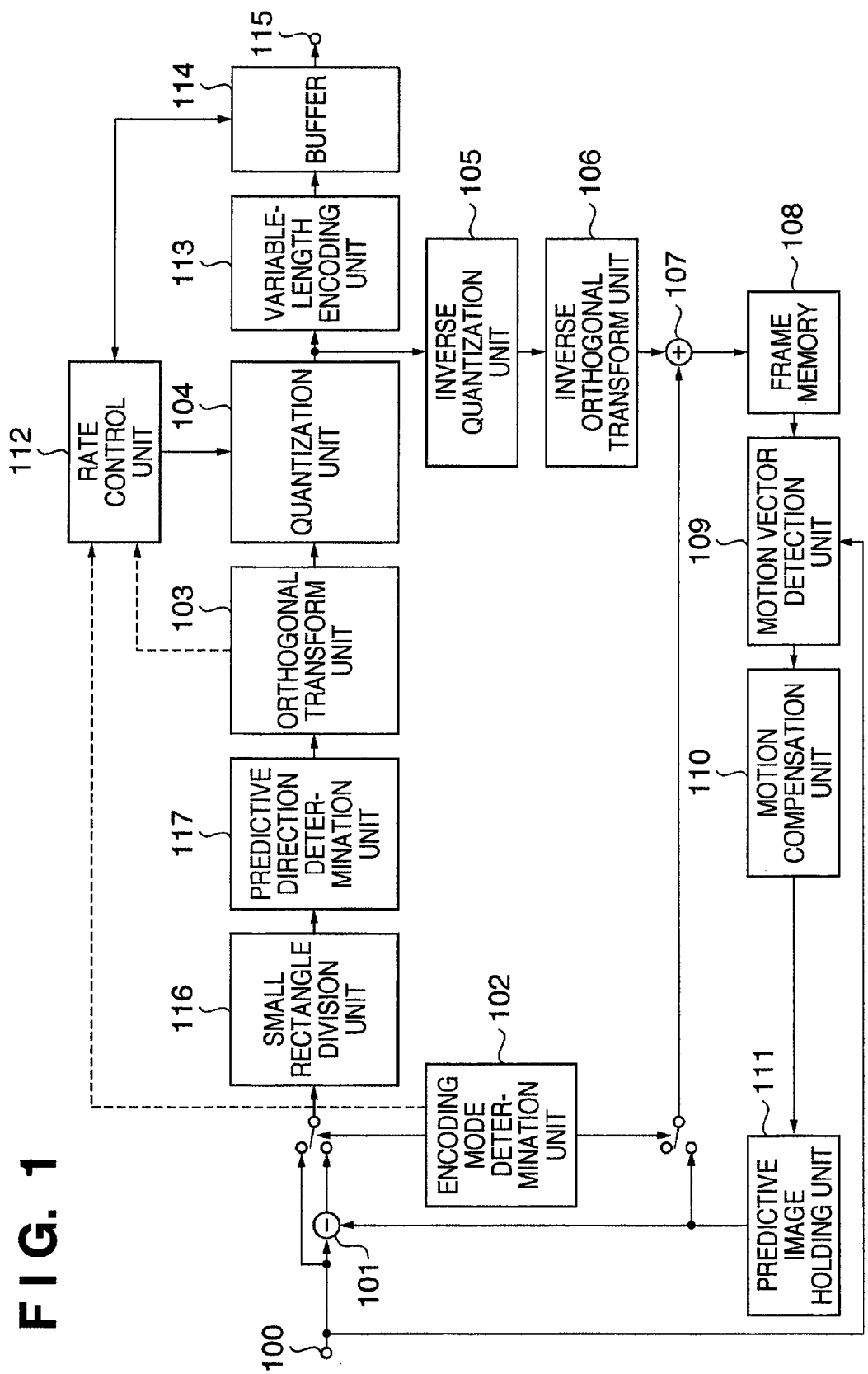
FIG. 1 is a block diagram showing the arrangement of a moving-picture encoding apparatus.

FIG. 1 is a block diagram showing the arrangement of a moving-picture encoding apparatus.

An input unit 100 inputs digital moving-picture data formed by a plurality of time-sequenced frames. A subtractor 101 calculates a difference (to be referred to as a predictive error hereinafter) between a frame input from the input unit 100 and a predicted value output from a predictive image holding unit 111.

Each frame of the input moving-picture data is divided into small rectangular blocks Bij (each defined by, for example, 8×8 pixels, 16×16 pixels, or the like). When the input moving picture is a color image, processing is done for each macroblock (MBij>Bij) as a set of rectangular blocks Bij. A small-rectangle division unit 116 divides each frame of the input moving-picture data or the predictive error output from the subtractor 101 into macroblocks (MBs) under the control of an encoding-mode determination unit 102.

A prediction-direction determination unit 117 selects between intra-frame encoding and inter-frame predictive encoding for each frame. An orthogonal transform unit 103 orthogonally transforms a MB to be encoded for respective MBs. A quantization unit 104 executes scalar quantization of orthogonal transform coefficients output from the orthogonal transform unit 103 under the control of a rate control unit 112.

A variable-length-encoding unit 113 executes variable-length encoding of quantized values output from the quantization unit 104, and outputs the encoded values to a buffer 114. The buffer 114 buffers a plurality of encoded frames, and outputs the plurality of encoded frames to an output unit 115 as data-compressed moving-picture data under the control of the rate control unit 112. Note that details of the rate control unit 112 will be described later.

An inverse quantization unit 105 inversely quantizes the quantized values output from the quantization unit 104 and outputs the orthogonal transform coefficients. An inverse orthogonal transform unit 106 inversely orthogonally transforms the orthogonal transform coefficients output from the inverse quantization unit 105 to decompress the MB or predictive error.

An adder 107 adds the MB decompressed by the inverse orthogonal transform unit 106 to the corresponding block of the predictive image held by the predictive image holding unit 111 to reconstruct the block to be encoded and stores the reconstructed block in a corresponding area of a frame memory 108 under the control of the encoding-mode determination unit 102. Alternatively, the adder 107 stores the predictive error decompressed by the inverse orthogonal transform unit 106 in a corresponding area of the frame memory 108.

When the encoding-mode determination unit 102 controls the orthogonal transform unit 103 to orthogonally transform a MB to be encoded, it controls the adder 107 to store the decompressed MB to be encoded in the frame memory 108. When the encoding-mode determination unit 102 controls the orthogonal transform unit 103 to orthogonally transform a predictive error, it controls the adder 107 to store the decompressed predictive error in the frame memory 108. That is, the frame memory 108 stores a locally decoded frame.

A motion-vector detection unit 109 detects, for each MB, a motion vector with reference to an encoded image of the immediately preceding frame to be encoded (previous frame) stored in the frame memory 108. In this case, the motion-vector detection unit 109 executes block matching within the range of ±15 pixels around the MB to be encoded, and detects a motion vector using, as a predictive block, a block which has a minimum average of the absolute sums of predictive errors.

A motion-compensation unit 110 generates a predictive image from the reconstructed frame (reference frame) stored in the frame memory 108 using the detection information (motion vectors) of the motion-vector detection unit 109, and stores the generated predictive image in the predictive image holding unit 111. The predictive-image holding unit 111 outputs the stored predictive image to the subtractor 101 and adder 107.

[Rate Control Unit]

Figure 2:
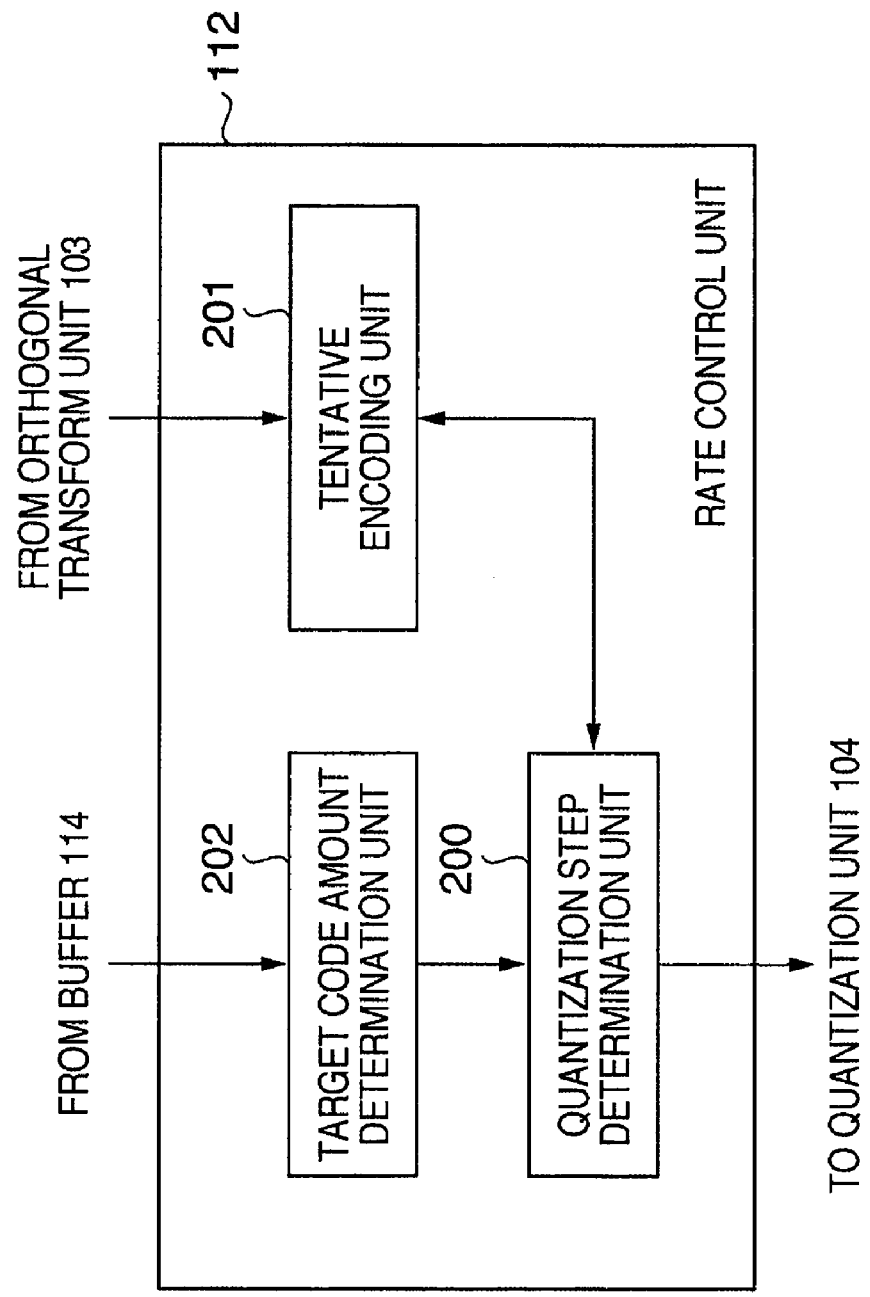
FIG. 2 is a block diagram showing the arrangement of a rate control unit.

FIG. 2 is a block diagram showing the arrangement of the rate control unit 112.

At the beginning of encoding, a target code amount determination unit 202 outputs a predetermined target amount of code, and a quantization step determination unit 200 sets a predetermined quantization step in the quantization unit 104.

After encoding starts, and codes are stored in the buffer 114, the target code amount determination unit 202 outputs a target amount of code of each frame based on the code storage state. The quantization step determination unit 200 outputs a quantization step according to the target amount of code to a tentative encoding unit 201.

The tentative encoding unit 201 quantizes the orthogonal transform coefficients of the current frame input from the orthogonal transform unit 103 by the quantization step input from the quantization step determination unit 200. Furthermore, the tentative encoding unit 201 encodes the quantized values by the same method as the variable-length encoding unit 113, and notifies the quantization step determination unit 200 of the amount of generated data.

If the amount of generated data (to be referred to as a predictive amount of code hereinafter) that the quantization step determination unit 200 is notified by the tentative encoding unit 201 falls within an allowable range of the target amount of code, the quantization step determination unit 200 sets the above quantization step in the quantization unit 104 to execute encoding of the current frame. On the other hand, if the predictive amount of code falls outside the allowable range of the target amount of code, the quantization step determination unit 200 sets a quantization step, which is adjusted to make the amount of generated data fall within the allowable range of the target amount of code, in the quantization unit 104, thus executing encoding of the current frame.

With this arrangement, although calculations in an amount nearly twice that required for actual encoding are required, the amount of generated data can be accurately estimated prior to actual encoding.

Figure 3:
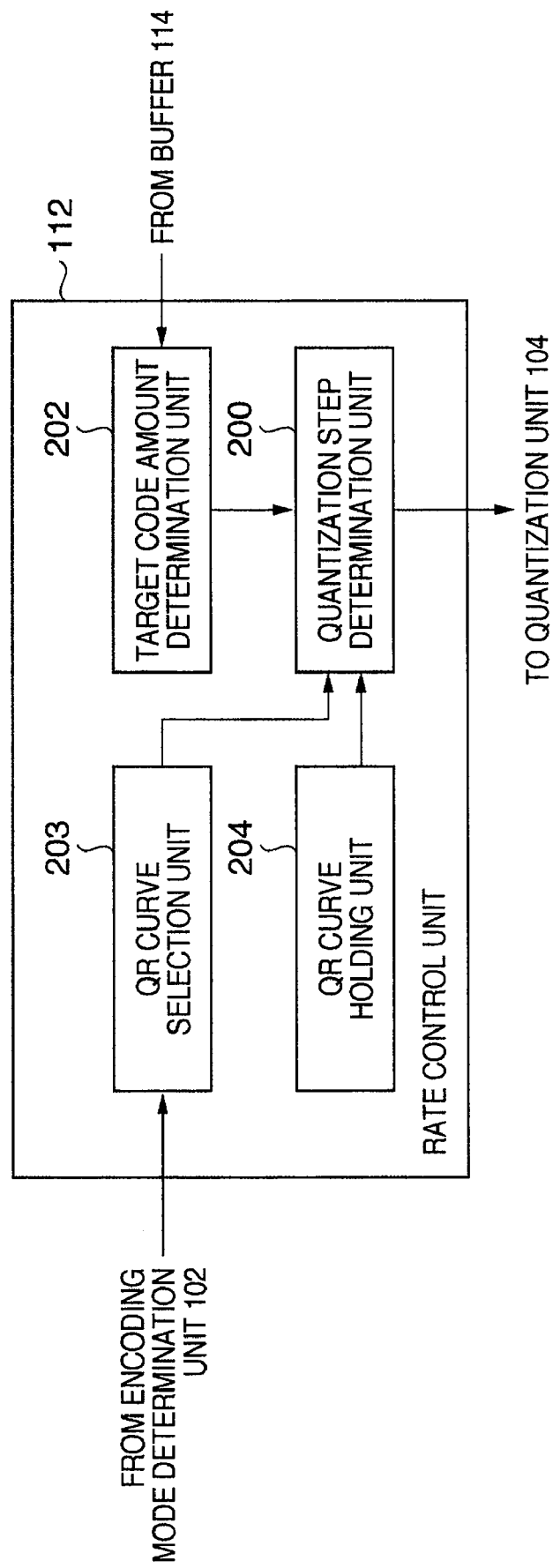
FIG. 3 is a block diagram showing another arrangement of the rate control unit.

FIG. 3 is a block diagram showing another arrangement of the rate control unit 112.

A QR curve holding unit 204 is a memory which holds the relationship (QR curve) between the empirically calculated quantization step Q and the amount R of generated data. The QR curve is prepared for respective types of pictures such as a frame which is to undergo intra-frame coding (intra-coded picture), a frame which is to undergo forward prediction (predictive picture), and a frame which is to undergo bi-directional estimation (bi-directional predictive picture). Note that the QR curve is expressed by a polynomial (QR function, $R=f(Q)$) having the quantization step Q as a variable.

A QR curve selection unit 203 outputs selection information of a QR curve held by the QR curve holding unit 204 based on information indicating the type of picture of the current frame output from the encoding-mode determination unit 102. The quantization step determination unit 200 sets a quantization step according to a target amount of code in the quantization unit 104 with reference to the QR curve indicated by the selection information, thus executing encoding of the current frame.

Since the QR curve changes depending on the resolution and the number of tones (bit depth) of moving-picture data, and the characteristics of objects in the moving-picture data, there is no guarantee that the target amount of code can be surely obtained. However, the arrangement of the rate control unit 112 shown in FIG. 3 can reduce the calculation cost compared to that shown in FIG. 2.

The QR curves may be stored in the QR curve holding unit 204 in association with not only the types of pictures but also the resolutions and bit depths of moving pictures. In this case, the QR curve selection unit 203 acquires information indicating the resolution and the bit depth of input moving-picture data from header information or the like of the moving-picture data, and can select a QR curve in accordance with the type of picture, resolution, and bit depth. If the resolution and the bit depth of a moving picture do not match any typical resolutions and bit depths of QR curves held in the QR curve holding unit 204, a QR curve which has a resolution and bit depth closest to those of the moving picture is selected.

Figure 4:
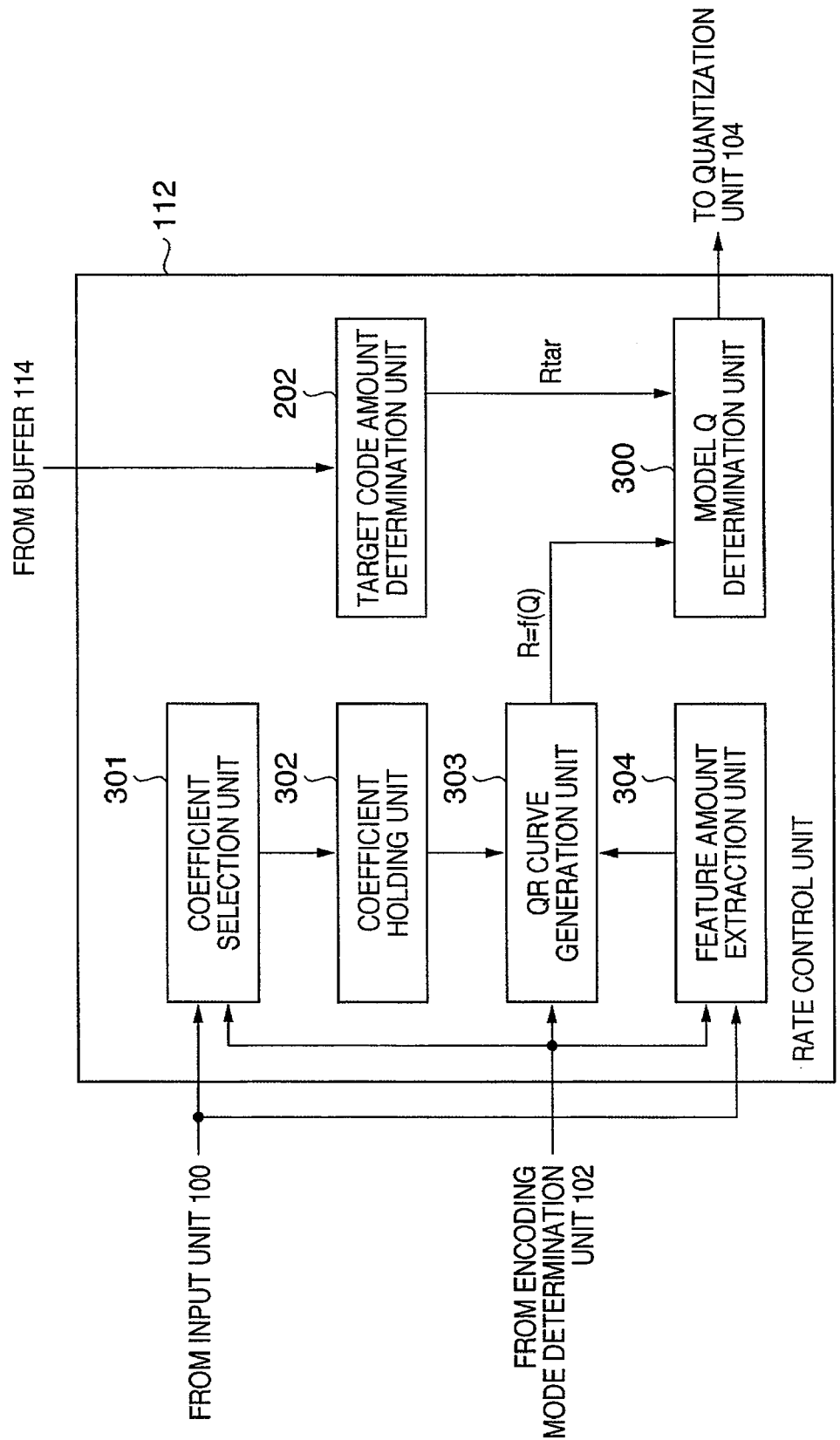
FIG. 4 is a block diagram showing still another arrangement of the rate control unit.

FIG. 4 is a block diagram showing still another arrangement of the rate control unit 112.

A coefficient holding unit 302 is a memory which holds coefficient sets according to the resolutions of moving pictures. The coefficient sets are prepared for respective types of pictures such as a predictive picture (P-picture), bi-directional predictive picture (B-picture), and the like and for respective typical resolutions and bit depths.

A coefficient selection unit 301 acquires information indicating the resolution and bit depth of an input moving picture from header information or the like of the moving picture. Then, the coefficient selection unit 301 selects a coefficient set held by the coefficient holding unit 302 in accordance with the type of picture, resolution, and bit depth of the current frame output from the encoding-mode determination unit 102. When the resolution and bit depth of a moving picture do not match any typical resolutions and bit depths of coefficient sets held by the coefficient holding unit 302, the coefficient selection unit 301 selects a coefficient set, the resolution and bit depth of which are closest to those of the moving picture.

A feature amount extraction unit 304 extracts a feature amount (for example, a statistical amount such as an average variance of luminance values for each MB) of the current frame when the type of picture output from the encoding-mode determination unit 102 is other than an intra-coded picture (I-picture).

A QR curve generation unit 303 generates a QR curve (QR function, R=f(Q)) based on the coefficient set output from the coefficient holding unit 302 (that selected by the coefficient selection unit 301), and the feature amount output from the feature amount extraction unit 304. The QR curve generation unit 303 inputs the generated QR curve to a model type Q determination unit 300. Note that the QR curve generation unit 303 outputs the QR curve when the type of picture output from the encoding-mode determination unit 102 is other than an I-picture, and does not output any QR curve when the type of picture is an I-picture.

In this way, when the current frame is the first frame of a moving picture or an I-picture immediately after a scene change, neither extraction of the feature amount nor generation and output of a QR curve are executed. A QR curve is generated to determine coefficients of a polynomial having the quantization step Q as a variable.

When no QR curve is input from the QR curve generation unit 303, the model type Q determination unit 300 sets a quantization step determined by the quantization step determination method described in, for example, FIG. 2 or 3 in the quantization unit 104, thus executing encoding of the current frame. When the QR curve is input from the QR curve generation unit 303, the model type Q determination unit 300 sets a quantization step determined according to the target amount of code based on the QR curve in the quantization unit 104, thus executing encoding of the current frame.

Figure 5:
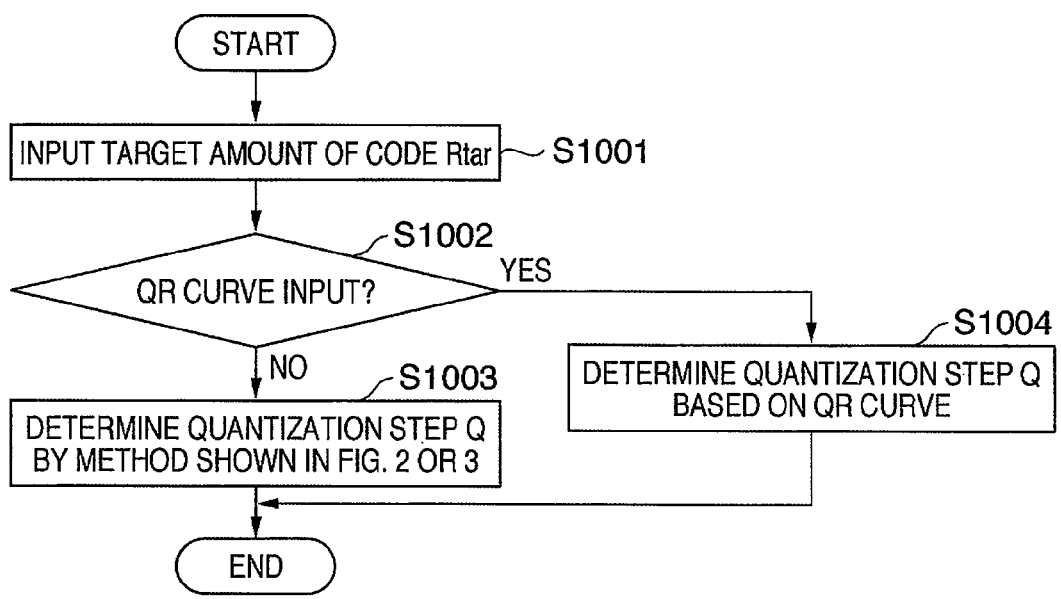
FIG. 5 is a flowchart showing the processing of a model type Q determination unit.

FIG. 5 is a flowchart showing the processing of the model type Q determination unit 300. Note that FIG. 5 shows the processing for one frame. That is, the model type Q determination unit 300 repeats the processing shown in FIG. 5 as many as the number of frames.

Upon starting the processing, the model type Q determination unit 300 receives a target amount of code Rtar from the target code amount determination unit 202 (S1001), and checks if a QR curve is input from the QR curve generation unit 303 (S1002). If no QR curve is input, the model type Q determination unit 300 determines a quantization step using the quantization step determination method described using, for example, FIG. 2 or 3 (S1003).

If a QR curve is input, the model type Q determination unit 300 determines a quantization step Q according to the target amount of code Rtar based on the QR curve (S1004).

Figure 6:
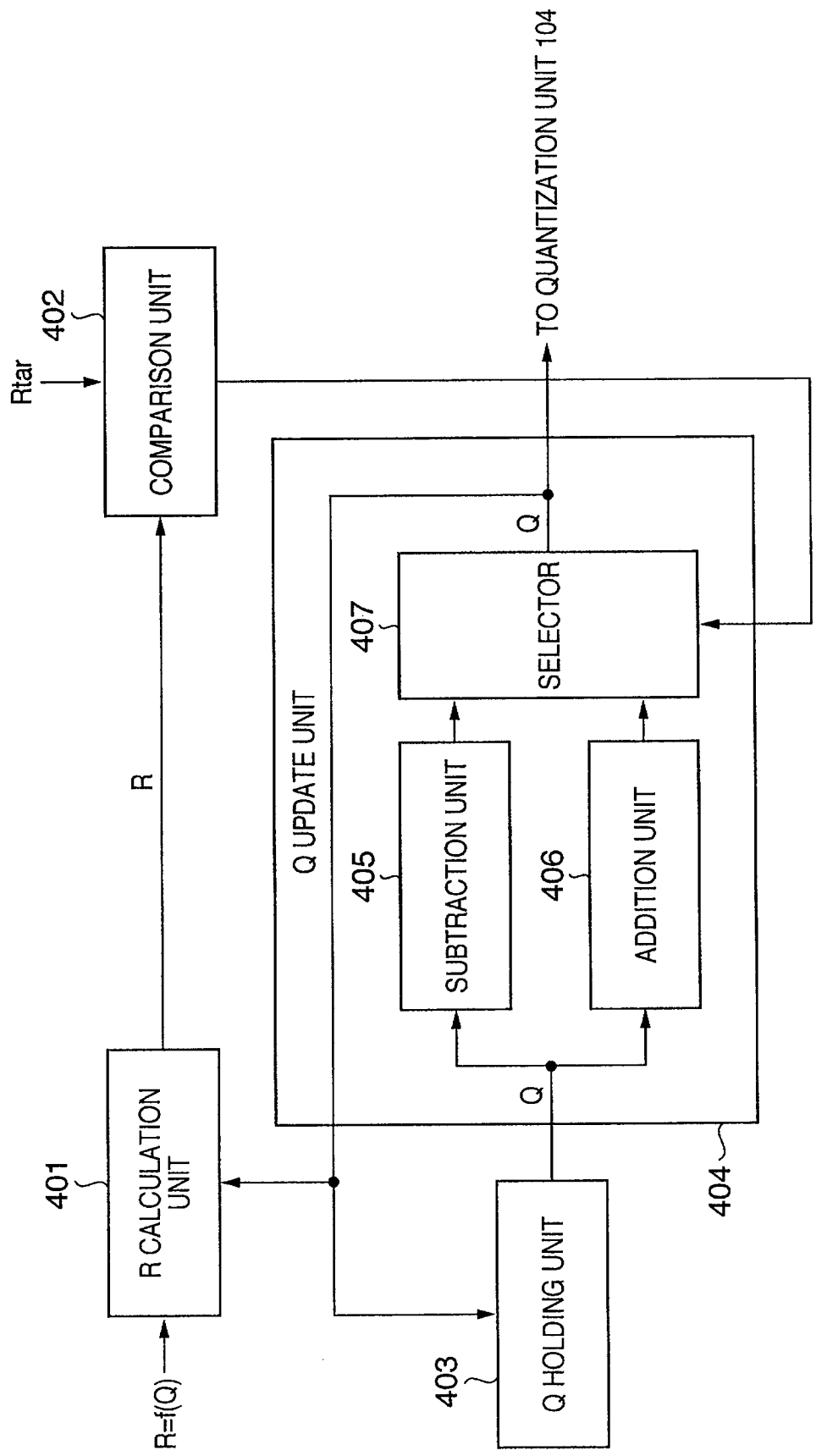
FIG. 6 is a block diagram showing the arrangement of the model type Q determination unit.

FIG. 6 is a block diagram showing the arrangement of the model type Q determination unit 300.

A Q holding unit 403 holds a quantization step Q updated by a Q update unit 404. An R calculation unit 401 calculates an amount of code R using the quantization step Q input from the Q update unit 404 and the QR function (R=f(Q)) input from the QR curve generation unit 303. A comparison unit 402 compares the target amount of code Rtar input from the target code amount determination unit 202 with the amount of code R input from the R calculation unit 401. The Q update unit 404 updates the quantization step Q held by the Q holding unit 403 in accordance with the output from the comparison unit 402.

The Q update unit 404 comprises a subtraction unit 405 which subtracts a predetermined value from the quantization step Q held by the Q holding unit 403, and an addition unit 406 which adds a predetermined value to the quantization step Q held by the Q holding unit 403. Furthermore, the Q update unit 404 comprises a selector 407 which selects the subtraction result of the subtraction unit 405 or the addition result of the addition unit 406 in accordance with the output from the comparison unit 402.

In step S1004, according to a function Q=f(R) having the amount R of generated data as a variable, it is easy to determine the quantization step Q which meets the target amount of code Rtar. However, it is not easy to derive the quantization step Q that meets the target amount of code Rtar from the function R=f(Q) having the quantization step Q as a variable.

FIGS. 7A to 7C are views for explaining the method of determining the quantization step Q corresponding to the target amount of code Rtar using the QR function R=f(Q). Assume that the quantization step Q can assume the range from 1 to 51.

As shown in FIG. 7A, the Q update unit 404 saves "25" as a median value of the Q range in the Q holding unit 403 as an initial value of the quantization step Q, and makes the R calculation unit 401 calculate an amount of code R. The comparison unit 402 compares R with Rtar, and outputs a determination signal (ternary) indicating the comparison result. For example, if R>Rtar, as shown in FIG. 7B, the comparison unit 402 outputs "2". If R<Rtar, as shown in FIG. 7C, the comparison unit 402 outputs "1". If R=Rtar, the comparison unit 402 outputs "0".

When the comparison unit 402 outputs "2", the selector 407 selects the output from the addition unit 406; when the comparison unit 402 outputs "1", it selects the output from the subtraction unit 405. In other words, if R>Rtar, the selector 407 selects a quantization step Q obtained by adding 1 to the current quantization step Q by the addition unit 406 so as to reduce the amount of code R. If R<Rtar, the selector 407 selects a quantization step Q obtained by subtracting 1 from the current quantization step Q by the subtraction unit 405 so as to increase the amount of code R.

The Q update unit 404 repeats addition or subtraction of the quantization step Q until R=Rtar (determination signal=0, condition 1) or the determination signal changes from "2" to "1" (condition 2) or changes from "1" to "2" (condition 3). If the determination signal satisfies condition 1, 2, or 3, the Q update unit 404 outputs the quantization step Q at that time to the quantization unit 104. In this way, the quantization step Q that meets the target amount of code Rtar is determined by comparing the amount of code R calculated by substituting the quantization step Q in the function f(Q), and the target amount of code Rtar, and making the calculated amount of code R close to the target amount of code Rtar stepwise.

As the method of calculating the quantization step Q corresponding to the target amount of code Rtar in the model type Q determination unit 300, a binary tree method may be used to speed up the determination process of the quantization step.

According to the binary tree method, if R=f(Qi)<Rtar as a result of comparison between R=f(Qi) based on an initial value Qi of the quantization step with Rtar, a maximum Q value is set to be Qi, and R=f(Qc) is calculated using a median value Qc between Qi and a minimum Q value "1". If R=f(Qc)>Rtar, the minimum Q value is set to be Qc, and a median value between Qc and the maximum Q value is set to be Qc, thus calculating R=f(Qc). In this way, by making R=f(Q) close to Rtar, the quantization step Q corresponding to the target amount of code Rtar is determined.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-127104, filed May 11, 2007, which is hereby incorporated by reference herein in its entirety.

What is claimed is:

1. An image-processing apparatus for encoding a moving picture frame-by-frame, comprising:
   a coefficient memory which stores a plurality of coefficient sets corresponding to resolutions of frames and encoding methods of frames;
   a selector, arranged to acquire information indicating a resolution of a frame to be encoded, and to select, from the coefficient memory, a coefficient set based on the resolution and whether the frame to be encoded is an intra-coded picture to which intra-frame coding is applied, or a predictive coded picture which is encoded referring to another picture;
   an extractor, arranged to extract a feature amount of the frame to be encoded;
   a generator, arranged to generate, in a case that the frame to be encoded undergoes inter-frame predictive coding, a function representing a relationship between a quantization step and an amount of generated data based on the selected coefficient set and the feature amount; and
   a setting section, arranged to set, in a case that the generator generates the function, a quantization step according to a target amount of code based on the function in encoding of the frame to be encoded.

2. The apparatus according to claim 1, wherein the coefficient memory stores a plurality of coefficient sets which correspond to bit depths of moving pictures in addition to the resolutions of the moving pictures and the encoding methods of frames, and the selector further acquires information indicating a bit depth of the moving picture to be encoded, and selects a coefficient set from the coefficient memory in accordance with the resolution, the bit depth, and whether the frame to be encoded is the intra-coded picture or the predictive coded picture.

3. A method of an image-processing apparatus which comprises a coefficient memory for storing a plurality of coefficient sets corresponding to resolutions of frames and encoding methods of frames, and encodes a moving picture frame-by-frame and comprises the steps of:
   acquiring information indicating a resolution of a frame to be encoded, and selecting, from the coefficient memory, a coefficient set according to the resolution and whether a frame to be encoded is an intra-coded picture to which intra-frame coding is applied, or a predictive coded picture which is encoded referring to another picture;
   extracting a feature amount of the frame to be encoded;
   generating, in a case that the frame to be encoded undergoes inter-frame predictive coding, a function representing a relationship between a quantization step and an amount of generated data based on the selected coefficient set and the feature amount; and
   setting, in a case that the function is generated, a quantization step according to a target amount of code based on the function in encoding of the frame to be encoded.

4. The method according to claim 3, wherein the coefficient memory stores a plurality of coefficient sets which correspond to bit depths of moving pictures in addition to the resolutions of the moving pictures and the encoding methods of frames, and the selecting step includes acquiring information indicating a bit depth of the moving picture to be encoded and selecting a coefficient set from the coefficient memory in accordance with the resolution, the bit depth, and whether the frame to be encoded is the intra-coded picture or the predictive coded picture.

5. A non-transitory computer-readable medium storing a computer executable program for causing an image-processing apparatus which comprises a coefficient memory for storing a plurality of coefficient sets corresponding to resolutions of frames and encoding methods of frames, and encodes a moving picture frame-by-frame to implement a method comprising:
   acquiring information indicating a resolution of a frame to be encoded, and selecting, from the coefficient memory, a coefficient set according to the resolution and a frame to be encoded is an intra-coded picture to which intra-frame coding is applied, or a predictive coded picture which is encoded referring to another picture;
   extracting a feature amount of the frame to be encoded;
   generating, in a case that the frame to be encoded undergoes inter-frame predictive coding, a function representing a relationship between a quantization step and an amount of generated data based on the selected coefficient set and the feature amount; and
   setting, in a case that the function is generated, a quantization step according to a target amount of code based on the function in encoding of the frame to be encoded.

* * * * *